July 7, 1942.   M. TELKES   2,289,152
METHOD OF ASSEMBLING THERMO-ELECTRIC GENERATORS
Filed June 13, 1939
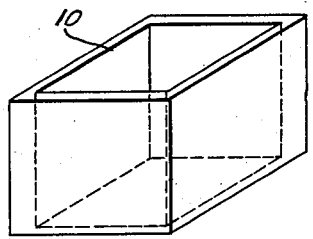
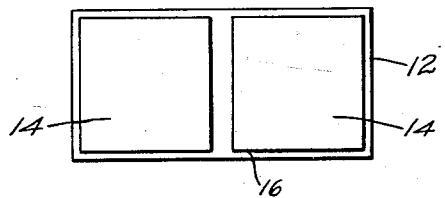
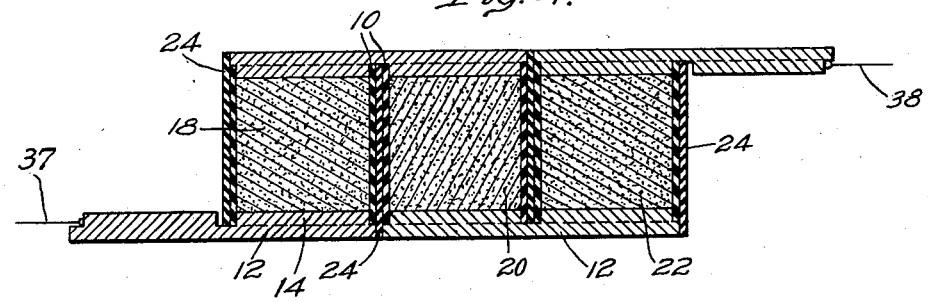
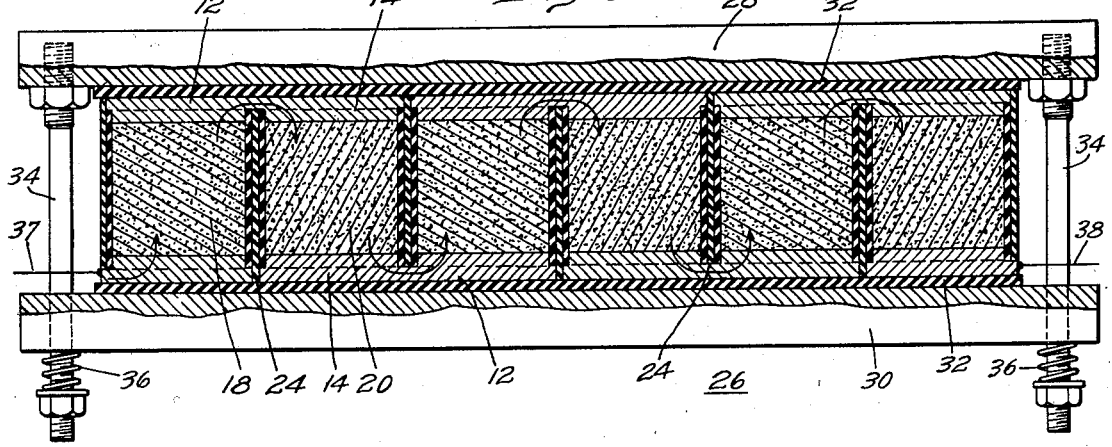
WITNESSES:
INVENTOR
Maria Telkes.
BY
ATTORNEY Patented July 7, 1942

2,289,152

UNITED STATES PATENT OFFICE 2,289,152

METHOD OF ASSEMBLING THERMOELECTRIC GENERATORS

Maria Telkes, Edgewood, Pa., assignor to Westinghouse Electric & Manufacturing Company, East Pittsburgh, Pa., a corporation of Pennsylvania Application June 13, 1939, Serial No. 278,864

2 Claims. (Cl. 136—5)

This invention relates to thermo-electric generators, and to the method of assembling them.

An object of this invention is to provide a thermo-electric generator.

Another object of this invention is to provide a thermocouple assembly having positive and negative elements formed from powdered material, which are integrally and electrically connected to each other, and retained in assembled relation under a substantially constant pressure.

A further object of this invention is to provide a method for making a thermo-electric generator from different powdered materials having positive and negative electrical characteristics.

Another object of this invention is to provide a method of assembling thermo-electric generators from positive and negative elements formed from powdered material.

Other objects of this invention will be better understood from reference to the accompanying drawing, in which:

Figure 1 is a view in side elevation of a conductor strap employed in this invention;

Fig. 2 is a bottom plan view of the conductor strap of Fig. 1;

Fig. 3 is a view in perspective of an insulating jacket employed in this invention;

Fig. 4 is a view in section of a thermocouple assembly employing the insulating jacket of Fig. 3 and the conductor strap of Fig. 2, and Fig. 5 is a view in elevation, partly in section of a thermo-electric generator constructed in accordance with this invention.

As is well known, thermocouples are formed from positive and negative elements connected at one end to form a hot junction, the opposite free ends of the elements forming the so-called cold junction. In practicing this invention, it is desired to form thermocouple elements employed in the thermo-electric generator from different materials having positive and negative electrical characteristics which have been found to have a very high efficiency in the conversion of thermal energy to electrical energy. In forming the elements of the thermo-electric generator of this invention, it is preferred to employ zinc and antimony powders in proportions of 45% to 42% by weight of zinc and about 58% to 55% by weight of antimony combined as hereinafter described to form a positive element, and a galena element containing from 2 to 5% by weight of excess of lead as the negative element. Thermoelectric elements having the zinc and antimony composition within the preferred range given hereinbefore are fully described and claimed in my copending application, Serial No. 265,199, filed March 31, 1939. In making the positive element a zinc-antimony alloy containing 42 to 45% of zinc can first be formed and then be powdered as described hereinafter.

In forming the positive and negative elements, the material for forming such elements is powdered, granulated or otherwise formed into powdered material and homogeneously mixed in order to get a substantial uniform distribution of either the zinc in the antimony, in the case of the positive element, or the lead in the galena powders in the case of the negative element. When uniformly mixed, the powders are then mixed with a suitable binder which may be a flux or any other material which is volatile at temperatures higher than the mixing temperature and which will not harm the desirable physical properties of the resulting element. These powders which are mixed with the binder are then preformed under suitable pressure at approximately room temperature to the approximate shape of the desired positive and negative elements.

After the powdered material is formed into the approximate shape of the desired elements, the preformed slug of positive or negative material is inserted into a suitable insulating jacket 10, shown in Fig. 3, the inside dimensions of which are the exact shape of the desired elements. The insulating jacket 10 has open ends, the purpose of which will be described hereinafter and is formed of any suitable refractory material such as asbestos or a mixture of asbestos and mica, or any other suitable material which is resistant to heat at a temperature ranging from 450° C. to 600° C. In practice, the preformed slug is of sufficient size to substantially completely fill the cavity in the insulating jacket 10 and may extend outwardly through the open ends thereof.

In order to assemble the positive and negative units of preformed powdered material into the form desired for forming the thermo-electric generator, the units are so positioned adjacent each other that the alternate units are positive and negative, respectively. In assembling the units alternately, a plurality of conductor straps 12 illustrated in Figs. 1 and 2 are associated with the open ends of the preformed units. These conductor straps are of any suitable conducting material such as copper base alloy or aluminum bronze, and are preferably of a material having a coefficient of expansion approximating the coefficient of expansion of the materials forming the positive and negative elements. As illustrated in Figs. 1 and 2, the conductor straps 12 have protruding portions 14 on one face thereof, the protruding portions being of a shape and size to fit within the open ends of the insulating jackets 10. As illustrated, a space 16 is provided between the protruding portions 14 on the conductor straps, the purpose of which will be explained more fully hereinafter.

In assembling the units, the conductor straps 12 are so disposed on opposite ends of the preformed units that each conductor strap spans a positive and negative unit. As illustrated in Fig. 4 of the drawing, the conductor straps at the opposite ends of the preformed units are so disposed that the opposite conductor straps alternately span a negative and positive element 18 and 20, respectively, and a positive and negative element 20 and 22, respectively, so that the adjacent elements will as hereinafter described, be connected in series circuit relation.

As illustrated in Fig. 4, the adjacent conductor straps 12 on each of the ends of the preformed units are electrically insulated one from the other by means of a thin strip of suitable insulating material 24 such as mica or the like. This insulating material 24 is of sufficient size that when the protruding portions 14 of conductor straps 12 fit inside the insulating jacket 10 as hereinafter described, the adjacent side walls of the insulating jackets 10 and the intermediate insulating layer 24 fills the space 16 between the protruding portions 14 of the conductor straps 12.

After the positive and negative units in their insulating jackets 10 are assembled as hereinbefore described with the conductor straps spanning the negative and positive units, the assembly is so placed in a suitable press (not shown) that the plates of the press seat upon the conductor straps on the opposite ends of the units. In practice, the press employed may be of the usual type, or may be of the type in which the press plates form electrodes for the passing of current therebetween. If of the usual type, the assembled unit under pressure can be placed in a suitable furnace and subjected to a temperature of between 500° and 550° C. to effect a sintering of the preformed powdered material forming the positive and negative units of the assembly. If the press is of the type in which the press plates form electrodes, then sufficient heat can be generated electrically in the powdered material forming the positive and negative units of the assembly to effect a sintering of such powdered material.

In subjecting the powdered material to sufficient heat to effect a sintering thereof, the preformed units are fused into solid masses within their respective insulating jackets 10 and the protruding portions 14 of the conductor straps 12 are forced into the open ends of the insulating jackets 10 as the powdered material therein shrinks as it is sintered. Further, it is found that the sintering of the powdered materials with the conductor straps in position therewith effects a fusion with the contacting faces of the protruding portions 14, thereby integrally uniting the conductor straps with the sintered positive and negative elements. In practice, where it is desired, the protruding portions 14 of the conductor straps 12 may be silver-plated in order to provide a better contact surface for uniting with the metals of the positive and negative elements. The protruding portions 14 are formed of sufficient depth to offset the shrinkage of the metals of the positive and negative elements during the sintering operation, the resulting elements having substantially the same length.

Referring to Fig. 5 of the drawing, the negative and positive elements 18 and 20 integrally united by the conductor straps 12 are illustrated in a thermo-electric generator assembly 26. This assembly comprises a heat absorber plate 28 and a cooling plate 30 mechanically retained in position about the assembled elements for maintaining them under a substantially constant pressure. In order to simplify the illustration of the thermo-electric generator 26, the details of the heat absorber plate 28 are not illustrated, it being understood that any suitable arrangement of fins or other means for absorbing heat from a given source may be utilized for concentrating the heat on the hot junction of the series circuit connected thermocouples which are utilized in the generator. The cooling plate 30 can be of any suitable type and can utilize either cooling fins or a circulation of water (not shown) within the plate.

In assembling the thermo-electric generator, the integrally united thermocouple elements are positioned between the heat absorber plate 28 and the cooling plate 30, and the conductor straps 12 of the thermocouple assembly are electrically insulated from the plates 28 and 30 by means of a layer of any suitable electrical insulating material 32 such as mica disposed over the external faces of the conductor straps.

In order to retain the thermocouple assembly under substantially constant pressure and in good thermal contact with the heat absorber plate 28 and the cooling plate 30, bolts 34 are positioned about the outer periphery of the heat absorber and cooling plates. As illustrated, springs 36 are utilized between the cooling plate 30 and the nut through which the pressure is applied to the assembly. The pressure thus applied can be varied somewhat and because of the springs 36 a substantial constant pressure will be applied to the assembled elements even under conditions of operation in which an expansion of the thermo-electric elements may occur.

In the particular generator illustrated, it is to be noted that the negative element 18 utilizes only one-half of a conductor strap 12 where the lead 37 is attached. This is only for matter of convenience and uniformity of structure, and where desired, a whole conductor strap 12 may be utilized in the manner illustrated in Fig. 4, the projecting unused portion of the projector strap forming a junction to which the lead wire 37 can be attached. A similar arrangement is utilized for the positive element 18 where the lead 38 is connected. In the particular generator illustrated, the current flow induced in the assembly upon a difference in temperature between the hot and cold junctions of the assembly is in the direction illustrated by the arrows.

By means of the method described hereinbefore, a whole assembly of the positive and negative elements for any particular thermo-electric generator can be formed simultaneously, thereby ensuring the producing of a plurality of thermocouple assemblies connected in series circuit relation having a uniform size with respect to thickness, the external contact surfaces of all of the conductor straps on each of the two ends of the assembled elements being in the same planes, thereby ensuring perfect thermal contact with the heat absorber and the cooling plates. Furthermore, by reason of the substantially constant pressure applied to the assembly, the physical and thermal contacts of the conductor straps with the heat absorber and cooling plates are maintained uniform throughout the assembly. The method described hereinbefore has simplified the making of a thermo-electric generator, giving a generator which has a very high degree of efficiency in operation.

Although this invention has been described with reference to a particular method and a generator, it is, of course, not to be limited thereto except insofar as is necessitated by the prior art and by the scope of the appended claims.

I claim as my invention:

1. In the method of making a thermocouple from a mass of powdered material, in combination, sintering the mass of powdered material in a confining insulating jacket, applying pressure to a conducting strap disposed on the mass of powdered material to force a projection provided on the strap into the confining jacket to make electrical contact with the mass therein and fill the space within the jacket resulting from shrinkage of the mass during the sintering whereby the confining jacket is supported by the sintered mass and the projection of the conducting strap.

2. In the method of making a thermocouple from powdered material, in combination, preforming quantities of different powdered material into masses of predetermined shape and size, sintering the different masses of powdered material in confining insulating jackets, and applying pressure simultaneously with the sintering treatment to a conductor strap disposed to span two adjacent masses of different powdered material to force projections provided on the strap into the confining jackets to make electrical contact with the masses therein and fill the spaces within the jackets resulting from shrinkage of the masses during the sintering whereby the confining jackets are supported by the sintered masses and the projections of the conducting strap therein.

MARIA TELKES.